(12) United States Patent
Wu et al.

(10) Patent No.: US 8,244,410 B2
(45) Date of Patent: Aug. 14, 2012

(54) INTELLIGENT DRIVING ASSISTANT SYSTEMS

(75) Inventors: Bing-Fei Wu, Hsinchu (TW);
Chao-Jung Chen, Hsinchu (TW);
Hsin-Yuan Peng, Hsinchu (TW);
Ying-Han Chen, Hsinchu (TW);
Wen-Hsin Lin, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 714 days.

(21) Appl. No.: 12/382,880

(22) Filed: Mar. 26, 2009

(65) Prior Publication Data

US 2010/0063649 A1    Mar. 11, 2010

(30) Foreign Application Priority Data

Sep. 10, 2008   (TW) ................................ 97134627 A

(51) Int. Cl.
*G05D 1/00* (2006.01)
*B60Q 1/00* (2006.01)
(52) U.S. Cl. .......................................... 701/1; 340/436

(58) Field of Classification Search .................. 701/216, 701/301, 45, 41, 35; 180/204; 340/436
See application file for complete search history.

(56) References Cited

U.S. PATENT DOCUMENTS

2006/0287826 A1* 12/2006 Shimizu et al. ............... 701/216
2007/0213905 A1*  9/2007 Funk et al. ..................... 701/45

* cited by examiner

*Primary Examiner* — James P Trammell
*Assistant Examiner* — Muhammad Shafi
(74) *Attorney, Agent, or Firm* — Bacon & Thomas, PLLC

(57) ABSTRACT

The invention discloses an intelligent driving assistant system applied to a handheld device. The invention can detect more than one safety mode including lane departure detection, lost-cargo detection, detecting front-object under driving condition, detecting side-object under driving condition and detecting back-object under driving condition, also the invention can mention alarm according to the detection results from different modules. Finally the invention can store the real-time image according to the detection results from different modules, and then transfer the related information to other places for real-time notice with matching the information from the GPS system and the digitized map.

7 Claims, 4 Drawing Sheets

INTELLIGENT DRIVING ASSISTANT SYSTEMS

BACKGROUND OF THE INVENTION

1. Field of the Invention

The invention discloses an assistant system for driving safety, more particularly to the assistant system for intelligent vehicle driving safety applied to a handheld device.

2. Description of the Prior Art

Normally, the intelligent driving assistant systems can make conventional vehicle driving much safer and more convenient. Several safety auxiliary apparatuses are installed inside and outside the vehicle, wherein the most basic way is to install the side mirrors and rear-view mirror outside and inside the vehicle respectively. Although rearview mirror can reflect the image to monitor the driving state at the side and back of vehicle, the blind spot still exists, which influences the driving safety seriously.

With different need recently, the parking monitor and related radar detection apparatus are installed inside and outside the vehicle, or the photographic apparatus is used to carry out outside photographing and to display the image. However there are some defects, including the inconvenience, blind spot, and limited anti-collision alarm function. The radar detection apparatus can only offer alarm sound to the driver, which cannot offer clear images for judgment.

In addition, due to the detector, radar, or photographic apparatus are usually installed at straight in the back of vehicle, and because the detecting angle and detecting distance of radar are limited, thus the detectable angle is also limited. It is unable to cover requirements of detection area for driving safety, even generate a lot of blind spots. The utilization environment is apt to be interfered by the external world seriously. Because the sound is used to alarm the driver, the driver is extremely apt to make misjudgment in the noisy environment of external world, thus the driving safety is influenced instead.

The prior art is disclosed in Taiwan Patent No. 90212262 of "Alarm Apparatus against Side Collision" and Taiwan Patent No. 88220406 of "The Reversing Radar Apparatus with Multiple Display Functions". The radar is installed at the front and back of vehicle, when the object is approaching, the detection will be activated to send out the signal at the same time. Thus when a lot of vehicles or objects pass through its detection coverage area, too many signals will be sent out and cause the misjudgment of driver. In addition, another prior art is disclosed in Taiwan Patent No. I268878 of "A Lane Detection Safety Alarm Method and System Based on a Computer Vision". It discloses most vehicle driving safety assistant systems employ single detection function (such as lane departure to carry on vehicle alarm. The invention can detect different safety modes through the selection of detection module. The more important thing is that the handheld device, such as PDA, mobile-phone and digital camera etc. can be embedded in the invention. The information of detected driving status can be sent out through the internet module to save the cost of manufacturing manpower and manufacturing time, thus that the intelligent driving assistant systems can be applied effectively to achieve the purpose of driving safety.

SUMMARY OF THE INVENTION

The invention discloses an intelligent driving assistant system. The first preferred embodiment comprises an image capturing apparatus for capturing the image; a detection module for selecting a safety detection mode; and a data processing module for driving the image capturing apparatus to capture an image according to the selected safety detection mode, and transferring the image to the data processing module for carrying out the calculation processing of driving parameters. The detection module is a menu interface of safety detection mode, which is used for the selection of driving safety detection mode.

The intelligent driving assistant system of the invention comprises a global positioning system (GPS) for providing the information of driving speed and current position.

The safety detection mode of the invention comprises lane departure detection, lost-cargo detection and the detection of front-object, side-object and back-object under driving condition.

The invention employs the data processing module to calculate the selected safety detection mode. If the abnormal driving condition is found, the alarm will be mentioned.

The second preferred embodiment of the invention comprises an image capturing apparatus for capturing the image; a detection module for selecting a safety detection mode; a data processing module for driving the image capturing apparatus to capture an image according to the selected safety detection mode, and transferring the image to the data processing module for carrying out the calculation processing of the driving parameters; an alarm module for providing the alarm according to the calculation result of driving parameters of data processing module; and a storage module for storing the image information of image capturing apparatus and the calculated driving parameters of data processing module. The storage module can be any non-volatile storage apparatus.

The invention employs the data processing module to calculate the selected safety detection mode, if the abnormal driving condition is found, the alarm will be mentioned and the image information captured by the image capturing apparatus and the driving parameter calculated by the data processing module will be stored, in order to save the memory space of the storage module.

The intelligent driving assistant system of the invention comprises a global positioning system for providing the information of driving speed and current position.

The intelligent driving assistant system of the invention comprises an internet module for transferring the stored content of storage module and the information of driving speed and current position to specific persons and other places.

The third preferred embodiment of the invention comprises an image capturing apparatus for capturing the image; a detection module for selecting a safety detection mode; a data processing module for driving the image capturing apparatus to capture an image according to the selected safety detection mode, and transferring the image to the data processing module for carrying out the calculation processing of the driving parameter; a storage module for storing the image information of image capturing apparatus and the calculated driving parameter of data processing module; and an internet module for transferring the information of storage module.

The intelligent driving assistant system of the invention comprises the global positioning system and the digitized map system for transferring the stored content of storage module and the information of road, driving speed and current position to other places.

The intelligent driving assistant system of the invention can be applied to a handheld device for detecting more than one driving safety mode.

The advantage and spirit of the invention can be understood further by the following detail description of invention and attached Figures.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The invention discloses intelligent driving assistant system. Please refer to FIG. 1; it is the invention, which shows a preferred embodiment of an intelligent driving assistant system.

Figure 1:
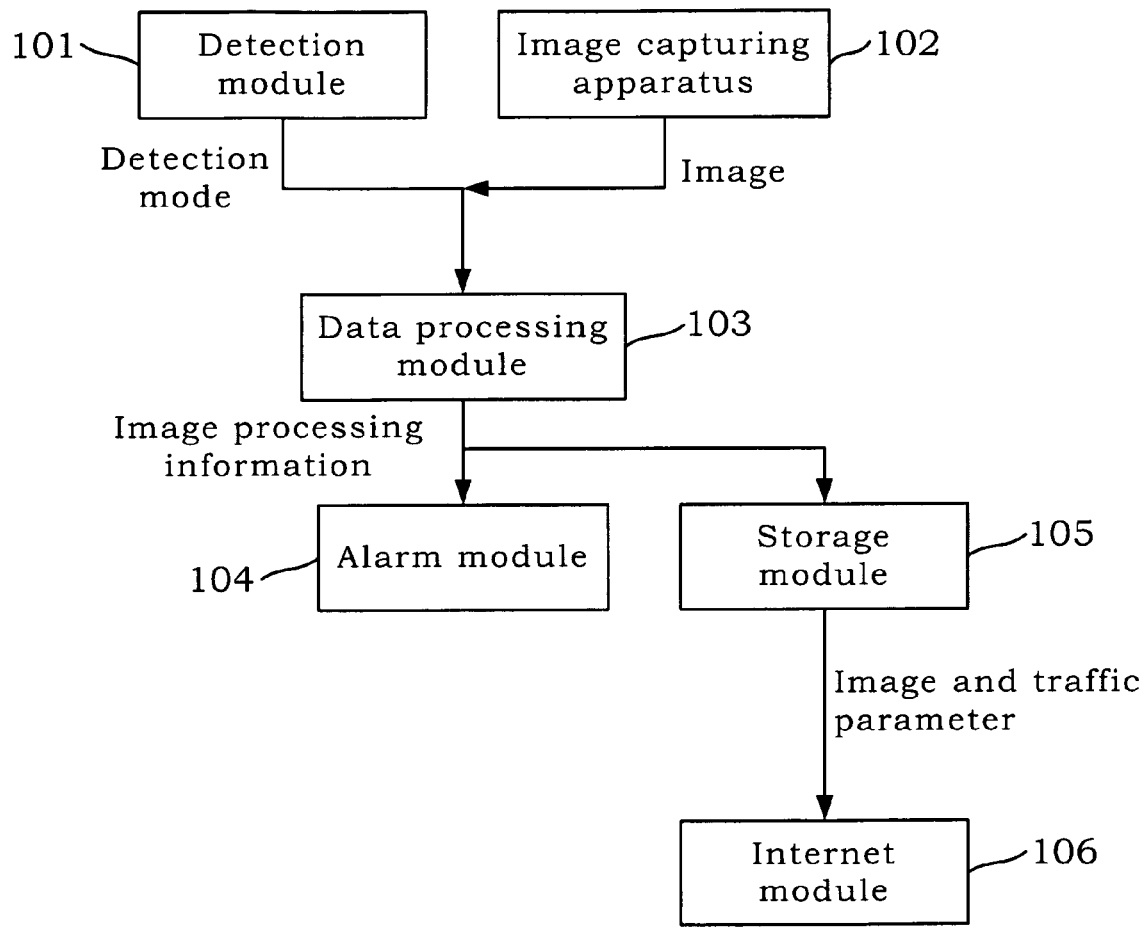
FIG. 1 shows the flowchart of system of the invention.

As the flowchart of detection system shown in FIG. 1, the detection module 101 is used to select the detection mode, and the detection mode is displayed on a handheld device. The detection module can operate the detection more than one detection mode at the same time, and can process storing according to the selected detection mode. The image capturing apparatus 102 is used to capture real-time image, which is detected in accordance with the selected detection mode through data processing module 103. The system will judge the image processing information calculated by data processing module 103, and employ the alarm module 104 to mention alarm or employ the storage module 105 to store image information. Finally, the internet module 106 is used to send out real-time image captured by image capturing apparatus. The handheld device includes mobile-phone, PDA, digital camera and GPS etc. The image capturing apparatus 102 may be commercial photographic apparatus, such as CCD or CMOS etc. The alarm message of alarm module 104 may be screen image, sound, LED, or vibration etc.

As shown in FIG. 1 again, as for the example of lane departure detection, the front real-time image is captured to the data processing module 103 by the image capturing apparatus 102, in order to carry out the lane mark detection and departure amount estimation. As for the lane mark detection, the characteristics of lane mark are mainly employed, including gray scale property, lane mark width and lane mark edge information etc. The possible points of lane mark are found through these characteristics. Then, the linear regression method is employed to delete the erroneous points, the points meeting the trend of whole lane mark are found to complete the step of lane mark detection. And then, refer to the relative position of lane mark and object in the image to find the distance pixels between the center of object and the center of the host lane. Employ the transformation of real three-dimensional (3D) world coordinate and two-dimensional (2D) image coordinate to calculate the distance between the center of object and the center of the host lane in order to produce a value. Compare the previous value with respect to the departure safe record threshold value and alarm threshold value set by the system designer.

Figure 2:
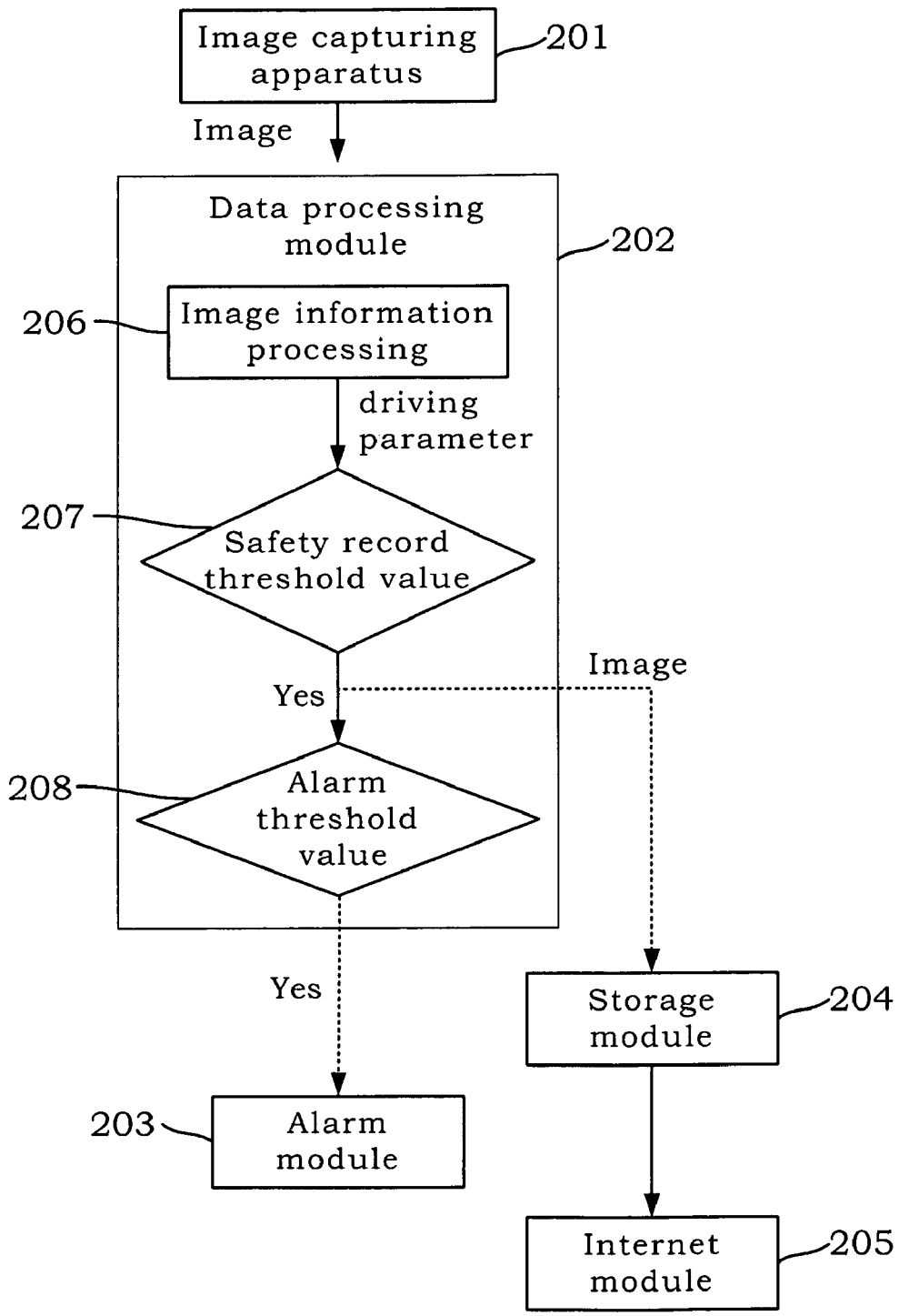
FIG. 2 shows the flowchart of detection system of the invention.

As shown in FIG. 2, after the image is processed by the image information processing 206 in the data processing module 202, if the value is higher than the alarm threshold value 208 in the data processing module 202, it means the object is going to departure the lane. Thus, the system mentions the alarm signal at once. The alarm signal may be the sound, light or vibration, which is used to remind the driver for caution. Before the departure value reaches the alarm threshold value 208, it will reach the safety record threshold value 207 in the data processing module 202 firstly. The safety record threshold value 207 will be less or equal to the departure alarm threshold value 208. When the departure value exceeds the safety record threshold value 207, the storage module 204 will be activated, and the real-time image captured by the image capturing apparatus 201 will be stored. In addition, when the real-time image captured by the image capturing apparatus 201 is stored, the real-time image can be compressed by the system and stored in default non-volatile storage apparatus, and the stored image will be transferred by the internet module 205.

As shown in FIG. 2 again, as for detecting front-object under driving condition, the characteristics of object in the image will be analyzed firstly, in order to be used as the basis for the identification of detection. As for the example of front vehicle, the vehicle in the image own more complicated edge characteristics than the road surface, including the vertical and horizontal edge characteristics. Then, make the statistics for the area having vertical and horizontal edge information to find an area with union characteristics, and the symmetrical area will be the position of vehicle. Finally, after the detection of front vehicle is completed in accordance with the characteristics of shadow appeared under the vehicle, the position of vehicle in the image can be determined. Calculate the relative distance between the front vehicle and the host vehicle. When the distance is shorter than the safety record threshold value 207, the recording function will be activated. When the distance is shorter than the alarm threshold value 208, the relevant alarm will be sent to the driver through the alarm module 203 to increase the driving safety.

Figure 3:
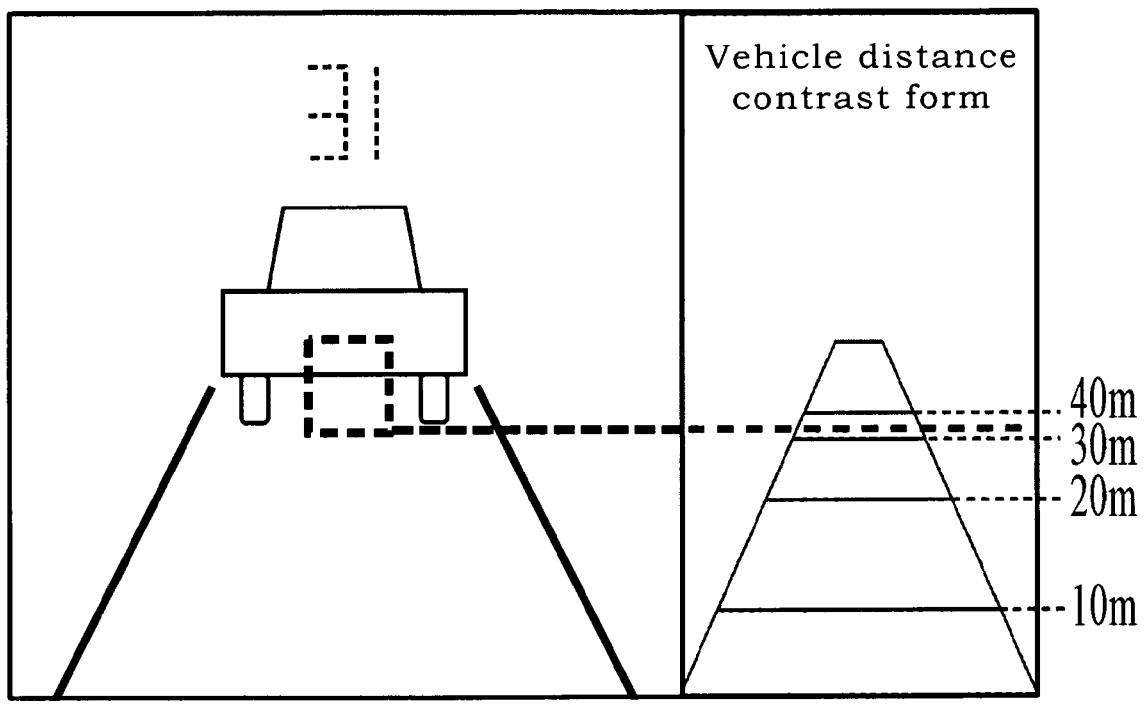
FIG. 3 shows the embodiment of detection example of the invention.

As the embodiment of detection example shown in FIG. 3, there are two kinds of method for judging the distance. The first method is the correspondence method, which uses the pre-measured contrast form to correspond the position of vehicle bottom in the picture directly. The second method uses the parameters of camera setting, such as the setup elevation, tilt angle, and focus of lens etc., to calculate the distance pursuant to the relationship of 3D and 2D images. Though the second method is more accurate for the calculation of distance, it needs more calculation time and procedure.

Figure 4:
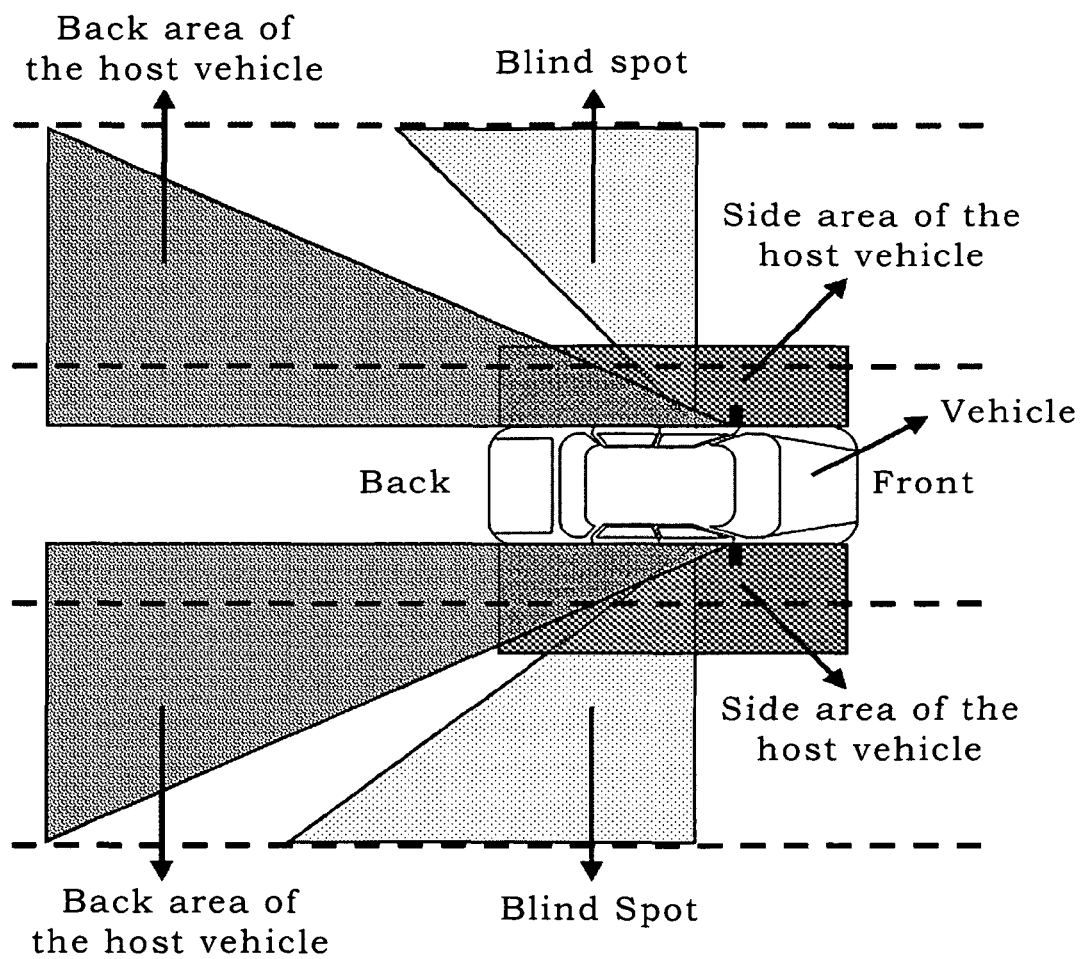
FIG. 4 shows the plane detection area of the invention.

As the plane detection area of vehicle shown in FIG. 4, though the detection methods for the blind spot of driver, side-object under driving condition, and back-object under driving condition are very similar, but the detection areas are different. After the image identification range is set by the corresponding area, the lane mark detection technique is used to revise the identification range, because the position of vehicle will not be immobilized in the lane mark after all. As for the example of vehicle in the identification range, the shadow area of vehicle bottom is used for detecting at daytime, and the paired headlight is used at night. When the shadow area of vehicle bottom is used for the identification, the shadow area must own the continuity, because the shadow area of vehicle bottom owns the continuity. The misjudgment caused by the dirt or scrappy shadow on road surface will be avoided. However the gray scale of shadow under real vehicle will be lower than the gray scale of vehicle body. This feature can be used to identify the area with lower gray scale as the position of real vehicle bottom. The feature of vertical edge can be used to revise the edge position at the left and right of the vehicle. The shadow which is not caused by the vehicle can be eliminated through the judgment of vertical edge. When the distance of side object is shorter than the safe record threshold value, the recording function will be activated. When the distance of side object is shorter than the alarm threshold value, the relevant alarm will be sent to the driver through the alarm module to increase the driving safety.

Upon recording real-time image, the signal of global positioning system (GPS) and the digitized map system are referred at the same time. The information of longitude and latitude is transformed to the position and road of object, which is recorded by the text file or the floating watermark embedded in the image. After the accident is occurred, these information not only can be used to help reconstructing the scene of accident (including image and the information for position related object), but also can be sent to the external world, such as the management unit of motorcade, appointed family member, through the wireless network (3G, Wi-Fi, WiMAX etc.), so that the current condition of vehicle can be mastered sufficiently under the allowable situation.

The invention also can receive the message provided by the external world through the network module. As for the example of vehicle driven on the road, the driving message of roadside unit or the driving message issued by the driving unit can be received by the network module of intelligent driving assistant system, including the alarm information such as the driving jam at front road, the accident at front road etc. Furthermore, except the message of text and sound, the network module even can receive in-time image released by the camera installed near the road, so that the people using the road not only can grasp the text message, but also can grasp real-time situation of road through real-time image offered. The roadside unit also can use the sensor (laser, microwave, camera) to obtain real-time driving parameters (flow-rate of vehicle, covering rate, mean vehicle speed etc.) and detect the incidents (jam level, accident vehicle etc.) automatically. The relevant detection information can be sent to the driving safety assistant system by wireless way, so that the people using the road can grasp real-time situation of front road.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An assistant system for intelligent vehicle driving safety, comprising:
    an image capturing apparatus for capturing a front real-time image;
    a detection module for selecting a safety detection mode that is displayed on a handheld device for providing information on a driving speed and a position of a vehicle, wherein the safety detection mode comprises lane departure detection, lost-cargo detection and detection of a front-object, a side-object and a back-object under driving conditions;
    a data processing module for driving the image capturing apparatus to capture the front real-time image according to a safety detection mode selected by the detection model, and transferring the front real-time image to the data processing module for carrying out a calculation processing of a driving parameter, wherein the data processing module is adapted to process image information and then process a safety record threshold value and an alarm threshold value;
    an alarm module for providing a vehicle operator with an alarm according to a calculation result of the driving parameter by the data processing module;
    a storage module for storing information of the front real-time image from the image capturing apparatus and the calculated driving parameter from the data processing module; and
    an internet module for transferring information of a driving road, the driving speed, the driving position, and receiving outside information;
    wherein after the front real-time image is processed by the image information processing in the data processing module, the following occur: (a) when a value is higher than the alarm threshold value in the data processing module for indicating that an object has departed from a lane, the alarm is activated, (b) when a departure value reaches the safety record threshold value of the data processing module before reaching the alarm threshold value, the safety record threshold value is set to be less or equal to the departure alarm threshold value, (c) when the departure value exceeds the safety record threshold value, the storage module is activated and the real-time image captured by the image capturing apparatus is stored, and (d) when the real-time image captured by the image capturing apparatus is stored, the real-time image being compressed and the stored image being transferred by the internet module.

2. The assistant system according to claim 1, wherein the front real-time image is selected from the group consisting of a lane departure image, a front vehicle image and a road surface image.

3. The assistant system according to claim 1, wherein the alarm module is selected from the group consisting of a screen image alarm, a sound alarm, a flashing LED alarm, and a vibration alarm.

4. The assistant system according to claim 1, wherein the internet module is adapted to connect to the internet to transfer information on a road, a driving speed, and a driving position, to receive outside information of a storage module, and to transmit the alarm.

5. The assistant system according to claim 1, further comprising a digitized map system for providing information on a road.

6. The assistant system according to claim 1, further comprising a global positioning system (GPS) for providing information on driving speed.

7. The assistant system according to claim 6, wherein the global positioning system (GPS) also provides information on vehicle position.

* * * * *